United States Patent [19]
Brennan

[11] Patent Number: 5,280,407
[45] Date of Patent: Jan. 18, 1994

[54] LINEARIZED FERROELECTRIC CAPACITOR

[75] Inventor: Ciaran J. Brennan, Arlington, Mass.

[73] Assignee: Charles Stark Draper Laboratory, Inc., Cambridge, Mass.

[21] Appl. No.: 9,050

[22] Filed: Jan. 26, 1993

[51] Int. Cl.⁵ .............................................. H01G 4/06
[52] U.S. Cl. ...................................... 361/311; 361/313; 361/321.1; 365/145
[58] Field of Search ............... 361/313, 320, 321, 311; 29/25.42; 257/295, 310, 312; 365/117, 145, 149; 437/60

[56] References Cited

U.S. PATENT DOCUMENTS

| | | | |
|---|---|---|---|
| 4,027,209 | 5/1977 | Maher | 29/25.42 |
| 5,206,788 | 4/1993 | Larson et al. | 361/313 |
| 5,216,572 | 6/1993 | Larson et al. | 361/313 |

Primary Examiner—Bruce A. Reynolds
Assistant Examiner—Gregory L. Mills
Attorney, Agent, or Firm—Joseph S. Iandiorio

[57] ABSTRACT

A linearized ferroelectric capacitor includes a ferroelectric dielectric medium; a doped region in the ferroelectric dielectric medium, the doped region having a charge of a first polarity which divides the medium into two sections of opposing polarized domains; and a pair of electrodes on the ferroelectric medium having a contact potential of a second, opposite polarity to that of the doped region for reinforcing and stabilizing the polarized domains in each section.

20 Claims, 2 Drawing Sheets

LINEARIZED FERROELECTRIC CAPACITOR

FIELD OF INVENTION

This invention relates to a linearized ferroelectric capacitor, and more particularly to such a capacitor which uses oppositely polarized adjacent domains to overcome hysteresis effects.

BACKGROUND OF INVENTION

Many materials are used as dielectrics in capacitors. These include glasses, ceramics, non-conductive metal oxides, plastics and polymers, and minerals of various types. The disadvantage of these non-ferroelectric dielectrics are the low dielectric constant of most of these materials. Most of these materials have relative permittivity values in the range of 1 to 100. A low dielectric constant requires that a capacitor be physically large to obtain large capacitance values, so the primary disadvantage is the size and weight of capacitors made with these materials. High dielectric ceramics gain their properties from an instability of the crystalline lattice which causes the ceramic to change phases with temperature. In certain phases the instability results in large values of permittivity, but the permittivity changes markedly with temperature.

Ferroelectric ceramics have also been used as capacitor dielectrics. The disadvantage of ferroelectric capacitors for use in most circuit applications is hysteresis. The hysteresis creates two disadvantages: it lowers the effective permittivity, and it creates switching effects which are unwanted in most circuits. When a voltage is first applied to a ferroelectric capacitor a large amount of charge is absorbed. This makes it appear as if the capacitor has a large dielectric constant. However, when the applied voltage is refumed to zero, only a fraction of the charge that went into the capacitor flows back out. The bulk of the charge is stored more or less permanently as remanent polarization in the capacitor. The only way to remove the remanent polarization electrically is to apply a reverse bias of the same magnitude as applied originally, which causes a reverse switching of the remanent polarization. This hysteresis means that the true dielectric constant of the capacitor as used in the circuit is actually much lower than the value computed when the remanent charge is included.

SUMMARY OF INVENTION

It is therefore an object of this invention to provide an improved ferroelectric capacitor.

It is a further object of this invention to provide such an improved ferroelectric capacitor which reduces or virtually eliminates hysteresis effects.

It is a further object of this invention to provide such an improved ferroelectric capacitor which has increased permittivity and capacitance.

It is a further object of this invention to provide such an improved ferroelectric capacitor which is suitable for fabrication in integrated circuits, hybrids and multichip modules.

It is a further object of this invention to provide such an improved ferroelectric capacitor which has a reduced temperature coefficient.

It is a further object of this invention to provide such an improved ferroelectric capacitor which is smaller and more compact.

It is a further object of this invention to provide such an improved ferroelectric capacitor which has increased linearity of dielectric response.

The invention results from the realization that a high linearity, low hysteresis ferroelectric capacitor with high permittivity can be effected by using a doped region to create oppositely polarized domains in adjacent regions of a ferroelectric dielectric medium and employing electrode contact potentials to reinforce and stabilize those polarized domains so that an external voltage applied to the capacitor will switch the polarization domains in one of the regions and upon the removal of the external voltage the electric field produced by the opposing domains in combination with the contact potentials will restore the switched domains to their original conditions and prevent retention of remanent charge due to hysteresis.

This invention features a linearized ferroelectric capacitor having a ferroelectric dielectric medium and a doped region in the ferroelectric dielectric medium. The doped region has a predetermined charge of a first polarity which divides the medium into two sections of opposing polarized domains. There is also a pair of electrodes on the ferroelectric medium which have a contact potential of a second, opposite polarity to that of the doped region for reinforcing and stabilizing the polarized domains in each section.

In a preferred embodiment the doped region may be in the middle of the medium. The doped region may have a positive polarity or a negative polarity. The electrode contact potential conversely may be negative or positive, respectively. The contact potentials may be approximately equal to each other and the charge established by the contact potentials may be approximately equal to the charge of the doped region.

The invention also features a linearized ferroelectric capacitor including a ferroelectric dielectric layer and a doped region generally in the center of the layer. The doped region has a charge of a first polarity which divides the layer into two sections of opposing polarized domains. There is a pair of electrodes on opposing faces of the ferroelectric dielectric layer having a contact potential of a second, opposite polarity to that of the doped region for reinforcing and stabilizing the polarized domains in each section. The doped region may be positive or negative polarity. The contact potential conversely may be of positive or negative polarity, respectively. The contact potentials may be opposite polarity to that of the doped region. The contact potentials may be approximately equal to each other and they may be equal in sum to the charge on the doped region.

In a broader view, the invention features a linearized ferroelectric capacitor which may have one or more than one doped region. There is a ferroelectric dielectric medium and at least one doped region in the ferroelectric dielectric medium. Each doped region has a polarity opposite to that of its adjacent doped regions. The doped regions divide the medium into a plurality of sections. Each section has domains polarized oppositely to that of adjacent sections. There are a pair of electrodes on the ferroelectric medium. Each electrode has a contact potential opposite to that of the adjacent doped region for reinforcing and stabilizing the polarized domains in each section.

In a preferred embodiment there may be an odd number of doped regions and the electrodes may have a contact potential of the same polarity, or there may be an even number of doped regions and the electrodes may have a contact potential of opposite polarity.

DISCLOSURE OF PREFERRED EMBODIMENT

Other objects, features and advantages will occur to those skilled in the art from the following description of a preferred embodiment and the accompanying drawings, in which.

Figure 1:
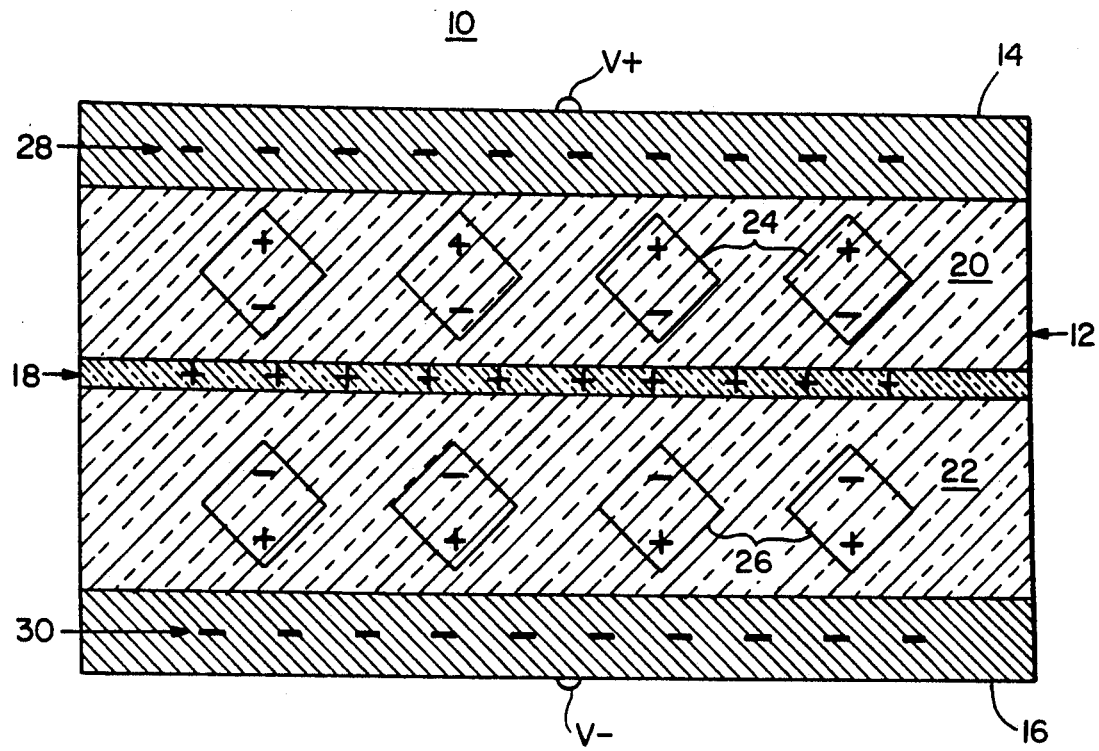
FIG. 1 is a schematic diagram of a linearized ferroelectric capacitor according to this invention.

There is shown in FIG. 1 a linearized ferroelectric capacitor 10 according to this invention including a ferroelectric dielectric medium 12 and a pair of electrodes 14 and 16. A doped region 18 separates medium 12 into two sections 20 and 22 including oppositely polarized domains 24 and 26, respectively. These domains are stabilized and reinforced by the electrode potentials of electrodes 14 and 16 which are indicated by the minus signs 28 and 30. The internal fields established by the opposing domains are generally equal and opposite and tend to force each other back into their quiescent condition as shown in FIG. 1. Thus if a positive voltage V+ is applied to electrode 14 and the negative voltage V− is applied to electrode 16, a charge is stored in capacitor 10 and domains 24 are switched from their present state to one in which their polarities are reversed as shown in FIG. 1. When later the positive voltage is removed from capacitor 10 and capacitor 10 is applied across a load, the combined effect of the field between the undisturbed polarized domains 26 in section 22 and the electrode contact potential 28 on electrode 14 urges the polarized domains 24 in section 20 to switch back to their original state as shown in FIG. 1, thus overcoming the nonlinearity due to the hysteresis effect and virtually eliminating the retention of any remanent charge.

In capacitor 10, the electrodes 14 and 16 may be made of ruthenium dioxide ($RUO_2$) or indium tin oxide (ITO) giving an electrode contact potential of approximately half a volt. The ferroelectric dielectric medium 12 may be lead zirconium titanate (PZT) and doped region 18 may be made from lanthanum or niobium to provide a charge $Q_d$ equal to approximately 0.5 of the spontaneous polarization $P_S$. The spontaneous polarization is typically between 20 and 40 microcoulombs/$cm^2$, so 0.5 $P_s$ would be in the range of approximately 10 to 20 microcoulombs/$cm^2$. The doped region 18 may be 0.02 $\mu$ in thickness and the sections 20 and 22 may be approximately 0.1 $\mu$ in thickness. The electrodes 14 and 16 may also be approximately 0.1 $\mu$ in thickness.

Although capacitor 10 in FIG. 1 is shown as having a positively doped region at approximately its middle portion and the electrodes 14 and 16 are shown as providing a negative contact potential, this is not a necessary limitation of the invention, as the doped region may be a negative doping and the contact potentials at electrodes 14 and 16 may be positive. In that case the domains 24 and 26 would simply have their quiescent polarization states reversed from that shown in FIG. 1.

Figure 2:
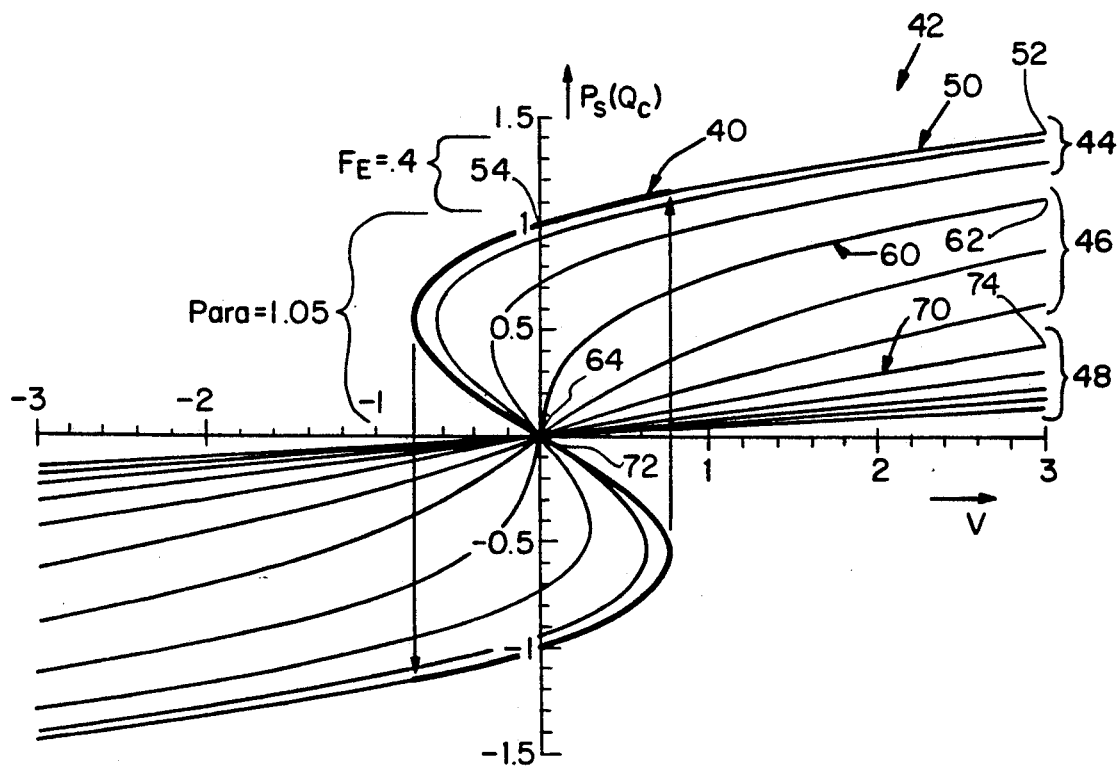
FIG. 2 is a series of characteristic curves showing the effect of the doped region on the linearized ferroelectric capacitor according to this invention.
Figure 3:
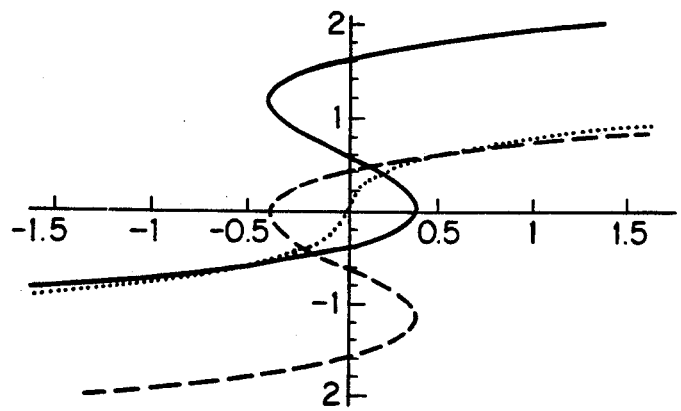
FIG. 3 shows the characteristic curves similar to FIG. 2 for the polarized domains in the capacitor of FIG. 1 along with the combined response for both sets of opposing domains taken together.

The effect of the doped region or layer on the operation of the device is shown in FIG. 2, where there is a family of characteristic curves showing the spontaneous polarization $P_s$, (or the charge on the capacitor $Q_c$) plotted against the voltage V externally applied to the capacitor, where the hysteresis loop 40 is shown in heavy lines. The curves 42 are broken into three groups: the ferroelectric group 44 in which the charge $Q_d$ in the doped layer is less than 0.5 of the spontaneous polarization $P_s$; a second paraelectric group 46 where the charge, $Q_d$, on the doped layer is greater than 0.5 $P_s$ but less than $P_s$; and a third linear group 48 which is more nearly linear, wherein the charge, $Q_d$, on the doped layer is greater than $P_s$. Taking curve 50 in group 44 as an example, it can be seen that an increase in voltage V produces a substantial charging of the capacitor up to a high value 52. But when the external voltage V is later removed, the charge in the capacitor drops only a small amount to the level at 54. Similar behavior is exhibited by the other curves in group 44. In the second group 46 the typical behavior is illustrated by curve 60, which reaches a peak at 62 when the voltage across the capacitor is set to a maximum. But when the voltage is removed it can be seen that the charge in the capacitor returns all the way to zero at 64 so that there is no hysteresis effect and no remanent charge. Curve 70, exemplary of group 48, also returns to zero at point 72, but its high point 74 is quite low, so while greater linearity is obtained by this linear group 48, the amount of charge able to be stored is much less than that in the paraelectric group 46. Thus the ferroelectric group 44, capacitor 10 shows a weakened hysteresis with reduced remanent polarization and coercive field. In the paraelectric group 46 capacitor 10 exhibits a paraelectric response characterized by a large permittivity with significant nonlinearity. In the linear group 48, the structure exhibits a linear response but at reduced permittivity. Thus if one is seeking greater linearity, operation in the range of $Q_d > P_s$, group 48 would be chosen, but if greater permittivity is desired and some lack of linearity can be tolerated, then the paraelectric group 46 would be chosen as the area of operation.

The dopant material in doped region 18 must be chosen to have a polarity opposite the contact potential 28 and 30 introduced by electrodes 14 and 16. With PZT as the ferroelectric medium 12, metal electrodes can be used, as most of them have negative potential with respect to PZT. The dopant material could be introduced for a brief period in the middle of a deposition of the ferroelectric to create the thin layer, or it could be injected by ion implantation after deposition of the ferroelectric.

It is preferred that the charge provided by the doped region 18 is approximately equal to the charge established by the electrode contact potentials. If the electrode material is chosen so that the contact potential is high and its charge significantly greater than the charge provided by the doped region 18, this could cause the material to fatigue with use to a lower permittivity linear material. That is, if one were to choose to operate in the paraelectric region of group 46, an excessive electrode potential would eventually cause the capacitor to absorb charge driving the operation mode from the paraelectric group 46 to the linear group 48, thereby losing some of the capacitor's charge capacity. Preferably the electrode potential is not so strong as to induce complete polarization of the ferroelectric.

Figure 4:
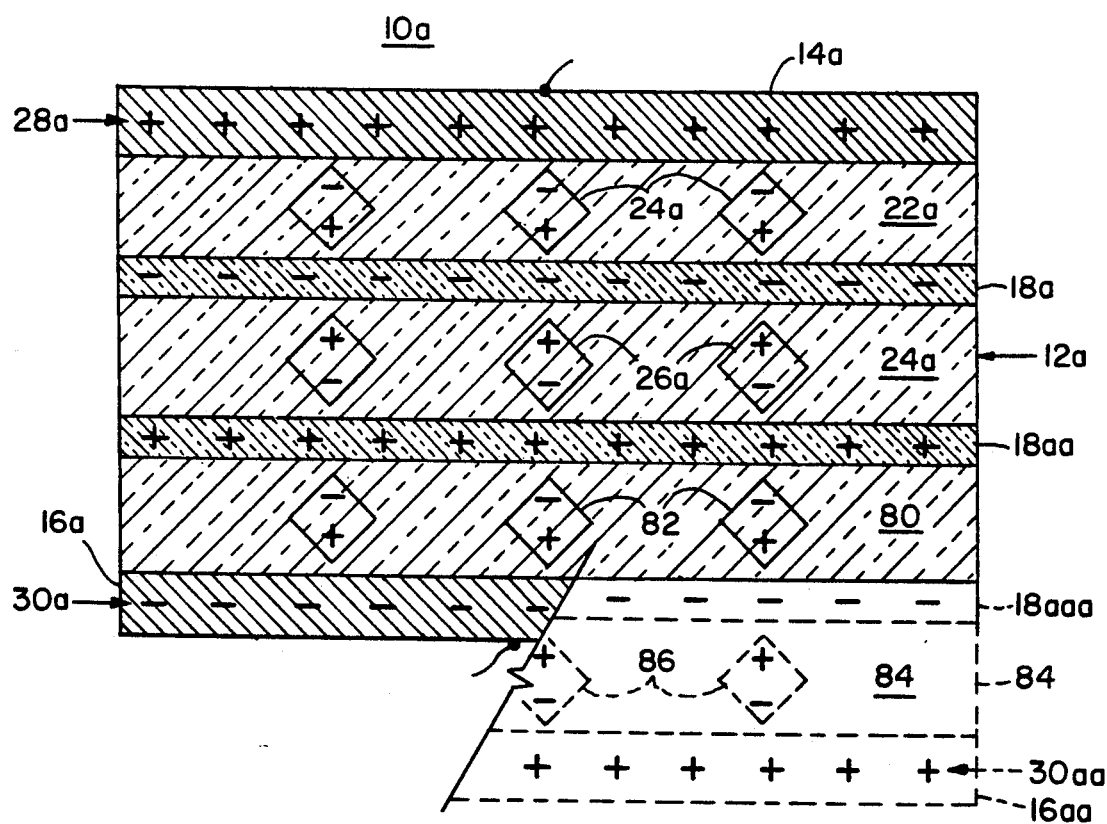
FIG. 4 is a schematic diagram of a multilayer device similar to FIG. 1 but including a number of doped regions.

Typically the contact potentials are approximately equal to each other and also have the same polarity, but this is not a necessary limitation of the invention. For example, in FIG. 4, where capacitor 10a includes a number of doped regions and separate sections of ferroelectric polarized domain sections, the electrodes can have different potentials and can have different polarizations. Capacitor 10a includes electrodes 14a and 16a. Ferroelectric medium 12a is divided into three sections 22a, 24a and 80, by two doped regions 18a and 18aa. Since electrode 14a has a positive contact potential 28a, the polarized domains 24a are reversed from those shown in section 22, FIG. 1. Likewise, polarizations 26a are reversed from that shown in section 22 of FIG. 1. The additional section 80 has its domains 82 reversed with respect to those in section 24a, and in this case electrode 16a has its contact potential 30a opposite to the contact potential 28a of electrode 14a. This will be the case where the number of sections created by the doped regions is an odd number. If an additional doped region 18aaa is added in place of electrode 16a with a concomitant additional section 84 having polarized domains 86, then there is an even number of sections created and electrode 16aa will have a positive contact potential 30aa similar to that shown in FIG. 1.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A linearized ferroelectric capacitor comprising:
   a ferroelectric dielectric medium;
   a doped region in said ferroelectric dielectric medium, said doped region having a charge of a first polarity which divides said medium to two sections of opposing polarized domains; and
   a pair of electrodes on said ferroelectric medium having a contact potential of a second opposite polarity to that of said doped region for reinforcing and stabilizing the polarized domains in each section.

2. The linearized ferroelectric capacitor of claim 1 in which said doped region is in the middle of said medium.

3. The linearized ferroelectric capacitor of claim 1 in which said doped region is of positive polarity.

4. The linearized ferroelectric capacitor of claim 3 in which said contact potentials are of negative polarity.

5. The linearized ferroelectric capacitor of claim 1 in which said contact potentials are approximately equal to each other.

6. The linearized ferroelectric capacitor of claim 1 in which said charge established by the contact potentials are approximately equal to the charge of said doped region.

7. The linearized ferroelectric capacitor of claim 1 in which said doped region is of negative polarity.

8. The linearized ferroelectric capacitor of claim 7 in which said contact potentials are of positive polarity.

9. A linearized ferroelectric capacitor comprising:
   a ferroelectric dielectric layer;
   a doped region generally in the center of said layer, said doped region having a charge of a first polarity which divides said layer into two sections of opposing polarized domains; and
   a pair of electrodes on opposing faces of said ferroelectric dielectric layer having a contact potential of a second opposite polarity to that of said doped region for reinforcing and stabilizing the polarized domains in each section.

10. The linearized ferroelectric capacitor of claim 9 in which said doped region is of positive polarity.

11. The linearized ferroelectric capacitor of claim 10 in which said contact potentials are of negative polarity.

12. The linearized ferroelectric capacitor of claim 9 in which said contact potentials are approximately equal to each other.

13. The linearized ferroelectric capacitor of claim 9 in which said charges established by the contact potentials are approximately equal to the charge of said doped region.

14. The linearized ferroelectric capacitor of claim 9 in which said doped region is of negative polarity.

15. The linearized ferroelectric capacitor of claim 14 in which said contact potentials are of positive polarity.

16. A linearized ferroelectric capacitor comprising:
   a ferroelectric dielectric medium;
   at least one doped region in said ferroelectric dielectric medium, each said doped region having a polarity opposite to that of its adjacent doped regions, said doped regions dividing said medium into a plurality of sections, each section having domains polarized oppositely to that of adjacent sections; and
   a pair of electrodes on said ferroelectric medium, each electrode having a contact potential opposite to that of the adjacent doped region for reinforcing and stabilizing the polarized domains in each section.

17. The linearized ferroelectric capacitor of claim 16 in which there are an odd number of doped regions and said electrodes have a contact potential of the same polarity.

18. The linearized ferroelectric capacitor of claim 16 in which there are an even number of doped regions and said electrodes have a contact potential of opposite polarity.

19. The linearized ferroelectric capacitor of claim 16 in which said contact potentials are approximately equal to each other.

20. The linearized ferroelectric capacitor of claim 16 in which said charge established by the contact potentials are approximately equal to the charge of said doped region.

* * * * *